Figure 1:
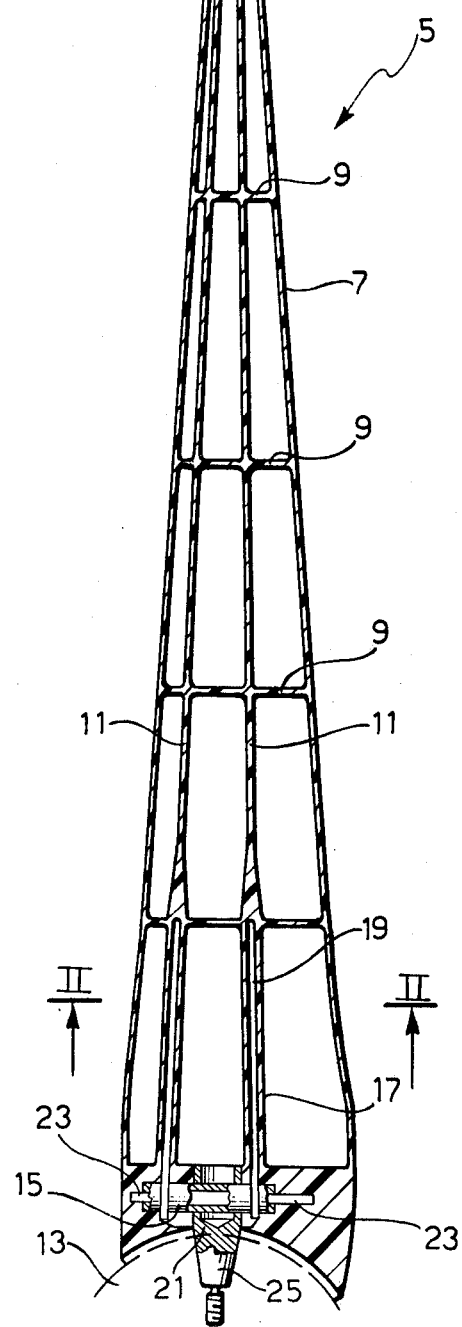

United States Patent [19]

Martinelli

[11] 4,278,401

[45] Jul. 14, 1981

[54] BLADE FOR WIND MOTORS

[75] Inventor: Gabriele Martinelli, Piossasco, Italy

[73] Assignee: Fiat Societa Per Azioni, Turin, Italy

[21] Appl. No.: 962,731

[22] Filed: Nov. 21, 1978

[30] Foreign Application Priority Data

Dec. 5, 1977 [IT] Italy ............................ 69727 A77

[51] Int. Cl.³ .................. F03D 1/06; F04D 29/34
[52] U.S. Cl. ............................ 416/230; 416/226;
416/229 R; 416/241 A; 416/248
[58] Field of Search .............. 416/229, 230, 241 A,
416/225, 226, 233, 239, 248

[56] References Cited

U.S. PATENT DOCUMENTS

| | | | |
|---|---|---|---|
| 1,372,086 | 3/1921 | Pick | 416/233 |
| 2,454,200 | 11/1948 | Perkins | 416/233 |
| 2,715,598 | 8/1955 | Rees et al. | 416/229 |
| 3,028,292 | 4/1962 | Hinds | 416/230 A |
| 3,554,664 | 1/1971 | Cheeseman et al. | 416/230 A |
| 3,645,481 | 2/1972 | Purdy | 416/241 A |
| 3,647,317 | 3/1972 | Furlong et al. | 416/229 |
| 3,720,481 | 3/1973 | Motta | 416/230 |
| 4,081,220 | 3/1978 | Andrews | 416/230 X |

FOREIGN PATENT DOCUMENTS 702039  1/1941  Fed. Rep. of Germany ...... 416/241 A

*Primary Examiner*—Everette A. Powell, Jr.
*Attorney, Agent, or Firm*—Sughrue, Rothwell, Mion, Zinn and Macpeak

[57] ABSTRACT

A wind motor blade of composite construction has a blade shell of plastics material reinforced internally by transverse ribs and intersecting longitudinal struts in which metal fork arms are embedded, the fork arms being connected to a metal root attachment spigot through a metal cross-piece encapsulated in the plastics material.

4 Claims, 2 Drawing Figures

U.S. Patent    Jul. 14, 1981    4,278,401

BLADE FOR WIND MOTORS

The present invention relates to blades for wind motors, in particular blades for attachment to a rotor hub of a wind motor.

It is known to fabricate blades for wind motors in light alloys such as aluminium alloys which have high strength and are weather-resistant. Such blades, however, have a considerable weight penalty, which in itself leads to undesirable stresses and deformations. Furthermore, the manufacturing cost of such blades is high.

It is also known to fabricate wind motor blades in synthetic resin material. Such blades, although of low weight and cost, present problems in the attachment of the blades to a rotor hub and in the incidence of aeroelastic vibrations.

An object of the present invention is to provide a blade for a wind motor having a secure connection between different materials such as metal and synthetic resin which have very different moduli of elasticity, so as to keep blade deformations under control, and to avoid in particular the occurrence of large amplitude aeroelastic vibrations.

The invention accordingly provides a blade for a wind motor having a metal attachment root, characterised in that the blade comprises a shell of plastics material having a number of internal transverse reinforcing ribs connected to at least two internal longitudinal members in which are embedded metal arms of the attachment root, which further includes a metal cross-piece to which said arms are attached, the attachment root also comprising a root member attached to said cross-piece for anchoring the blade to a rotor hub.

The blade construction according to the invention enables the wind loading exerted on the plastics blade shell to be transmitted through the ribs and longitudinal members to the metal cross-piece and thence to the attachment root member, with minimal blade deformation.

Figure 2:
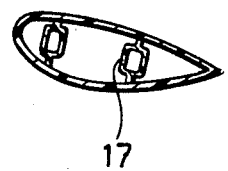

The invention will be further described, by way of non-limiting example, with reference to the accompanying drawings, in which:

FIG. 1 is a longitudinal sectional view of a wind motor blade according to one embodiment of the invention, and FIG. 2 is a cross-section taken on line II—II of FIG. 1.

With reference to the drawings, reference numeral 5 indicates generally a blade for a wind motor comprising a thin-walled shell of reinforced plastics material such as glass fibre reinforced plastics (g.r.p.) having an aerofoil section such as to be driven by wind flowing over the blade.

The blade 5 is supported internally by transverse ribs 9 the number of which will be chosen according to the length of the blade 5 and its desired rigidity. The internal ribs 9 also serve to reinforce the blade shell, avoiding the formation of local creases and ensuring a smooth blade profile during operation under wind loading. The ribs 9 are connected to internal longitudinal struts 11, also of a reinforced plastics material, which extend longitudinally within the blade shell and are connected to the internal surface of the blade shell along their opposite longitudinal edges.

The longitudinal struts 11, apart from having a blade-stiffening function, have chiefly a load-carrying function in that they transmit the load on the blade 5 to a rotor hub 13, shown partially in outline in FIG. 1 to which the blade is anchored by a metal fork attachment 15. Thus the wind loading applied to the blade shell 7 is transmitted through the ribs 9 to the internal struts 11, which in turn transmit the load to the hub 13 through the attachment 15.

The longitudinal struts 11 are, at their ends adjacent the hub 13, formed as hollow legs 17 of box section in which respective metal arms 19 of the fork attachment 15 are embedded. The fork attachment arms 19 are of steel or other high strength material and are connected to a cylindrical cross-piece 21 of the same material, extending transversely between and projecting beyond the root ends of the arms 19. The cross-piece 21 is hollow, having opposite end walls beyond the fork arms 11 from which respective cylindrical end pins 23 project, coaxially with the axis of the cross-piece 21. The lengths of the two end pins 23 will generally be different from each other, being selected according to the blade configuration.

The cross-piece 21 and the end pins 23, including the parts of the arms 19 and spigot 25 attached to the cross-piece 21, are embedded in plastics material formed integrally with that of the blade shell 7 and struts 11.

A blade root spigot 25 is attached to the cross-piece 21 between the two arms 19 and projects longitudinally beyond the radially inner end of the blade for the purpose of anchoring the blade 5 to the hub 13. The spigot 25 can have any shape according to the type of application of the blade. In the illustrated embodiment the spigot 25 has a tapered frusto-conical shape and terminates in a screw-threaded shank for attachment of the spigot to the rotor hub 13. The axis of the spigot 25 coincides with the longitudinal barycentric axis of the blade profile.

In the illustrated embodiment there would be three blades 5 such as that shown in the drawings anchored to the rotor hub 13 and extending radially from the hub with their axes inclined at 120° to each other.

The lengths of the fork arms 19 will be selected according to the required stiffness of the blade and to the required capacity of the blade assembly to withstand the flexural stresses resulting from wind loadings in use of the blade.

The cross-piece 21 and the end pins 23, being embedded in resin material connected to the longitudinal struts 17, serve to react the centrifugal force exerted by the blade 5 during its rotation about the axis of the hub 13.

The plastics-metal attachment structure of the blade 5 described herein allows a gradual transfer of the forces applied to the resin blade shell 7 to the metal attachment members, affording a convenient stiffness and avoiding the occurrence of vibration phenomena and elastic instability.

It will be appreciated that in some practical embodiments of the blade, the blade shell may have more than two internal longitudinal struts 11, and the attachment root of the blade may have more than two arms 19 embedded in the plastics material of the struts 11 and connected to the cross-piece 21.

I claim:

1. Blade for a wind motor, comprising, in combination:
    a hollow blade shell of plastics material having a number of internal transverse reinforcing ribs and at least two internal longitudinal reinforcing ribs interconnecting said transverse reinforcing ribs;

a metal reinforcement and attachment member embedded in said plastics material adjacent the radially inner end of the blade;

said metal member having at least two metal arms completely embedded in said longitudinal reinforcing ribs respectively, a metal cross-piece interconnecting said arms completely embedded in said plastics material, and a metal root member attached to said metal cross-piece and projecting longitudinally beyond the radially inner end of the blade for anchoring the blade to a rotor hub.

2. The blade defined in claim 1, wherein said root member has a frusto-conical shape tapering towards its free end.

3. The blade defined in claim 1, including two end pins extending transversely of the longitudinal axis of the blade from opposite ends of the cross-piece.

4. Blade defined in claim 3, wherein the cross-piece comprises a cylindrical member and the end pins comprise cylindrical pins extending coaxially with the axis of said cylindrical member.

* * * * *